Figure 1:
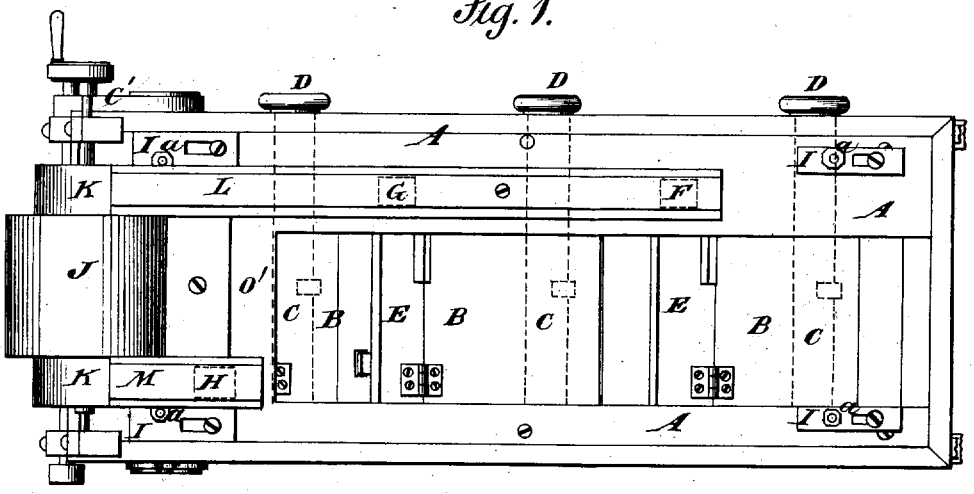

2 Sheets—Sheet 1.

E. CLARK,

Assignor to CONSOLIDATED MIDDLINGS PURIFIER CO.

Middlings Purifier.

No. 9,769. Reissued June 21, 1881.

Witnesses.
A. Rupsert,
J. G. Mason.

E. Clark,
Inventor.
By R. Mason
Atty.

N. PETERS. Photo-Lithographer, Washington, D. C.

E. CLARK,

Assignor to CONSOLIDATED MIDDLINGS PURIFIER CO.

Middlings Purifier.

No. 9,769. Reissued June 21, 1881.

Witnesses.
A. Ruppert
J. G. Mason

E. Clark
Inventor.
By R. Mason
Atty.

N. PETERS, Photo-Lithographer, Washington, D. C.

UNITED STATES PATENT OFFICE.

EDWIN CLARK, OF PORTLAND, PENNSYLVANIA, ASSIGNOR TO CONSOLIDATED MIDDLINGS PURIFIER COMPANY, OF JACKSON, MICHIGAN.

MIDDLINGS-PURIFIER.

SPECIFICATION forming part of Reissued Letters Patent No. 9,769, dated June 21, 1881.

Original No. 134,462, dated December 31, 1872. Application for reissue filed April 29, 1880.

*To all whom it may concern:*

Be it known that I, EDWIN CLARK, of Portland, in the county of Northampton and State of Pennsylvania, have invented certain new and useful Improvements in Flour and Middlings Separators; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to that class of machines known as "flour and middlings separators or dressers," and has for its object to furnish an improved machine for the purpose of separating bran from the flour or middlings, leaving the farina or middlings pure and in a proper condition for regrinding, and by this means restoring a large per cent. of the gluten to the starch portion of the wheat, being simple in construction, efficient in operation, and durable in use.

My invention consists, among other things, in attaching the shaker to the frame of the machine by slides and rods, the former of which are horizontally and the latter are vertically adjustable for the purpose of enabling the operator to regulate the throw of the bolter; and also in the use, in combination with the fan and screen, of a series of beaters grouped and distributed so as to strike against different parts of the cloth for dislodging particles adhering thereto and liable to clog the meshes; also, in the use of knockers for the same purpose, which, actuated by a shaft, slide upon guides and are made to strike against cross-pieces of the frame to jar the cloth; also, in combining in a purifier a case which incloses the screen and extends up to the fan for leading air-currents through the extent of the cloth, and a screen having the cloth intermediately supported between the sides of the frame, so as to hold it in a plane and distribute the middlings under treatment over its surface equally, and a series of beaters arranged in groups under the cloth, so as to act on different parts of its surface for keeping its meshes open, thus exposing the middlings passing in a uniform stream down the cloth to the equal action across the entire cloth of ascending currents of air which rise through the screen to the fan; also, in such specific combinations of special parts as are indicated in the claims to be made in this specification.

Figure 2:
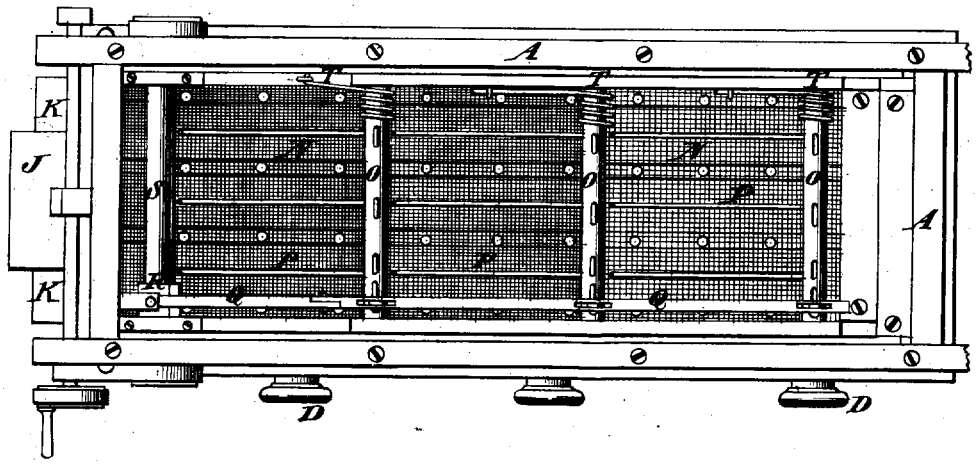
Figure 3:
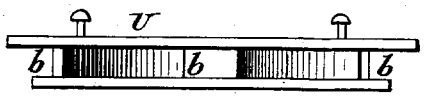
Figure 4:
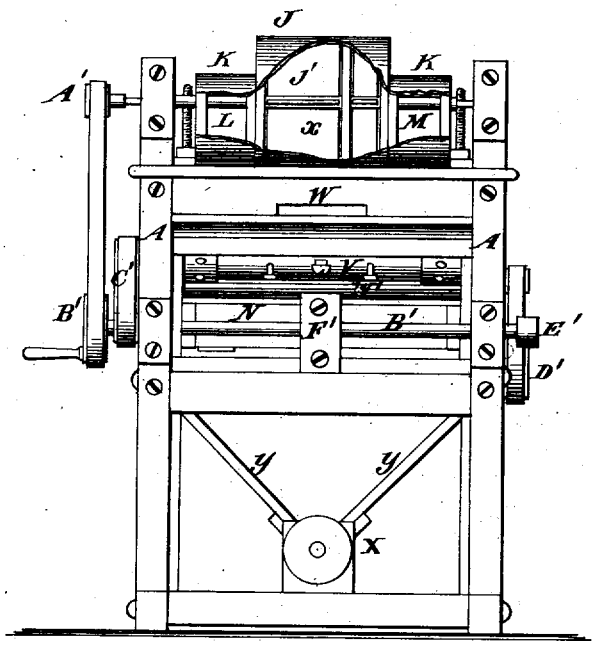
Figure 5:
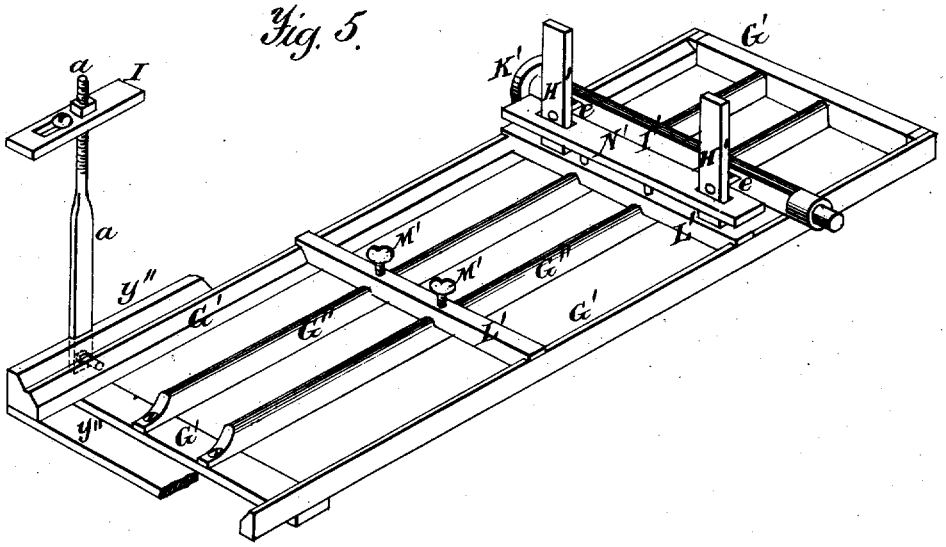

In the drawings, Figure 1 is a top view with a part of the frame-work cut away, showing the interior. Fig. 2 is a bottom view with the conveyer-box and attachments removed. Fig. 3 shows the end piece of the bolting-case. Fig. 4 is an end view of the machine. Fig. 5 is a perspective view of the bolt-frame and knockers with the cloth removed.

A represents a frame or case for the machine, which may be made in any suitable or desired form, so as to be conveniently adapted to the mechanism of the machine and convenience in construction.

B represents the valves, each of which is hinged to the bottom of the air-chamber in which it is placed. Below each of said valves, and attached to the same, are shafts C, suitably journaled in the sides of the frame, one end of which extends outside of the frame, and provided with the knobs D, by which means the valves can be easily and readily adjusted to admit more or less air, as desired. The air-chamber is entirely above the bolting-cloth.

E E represent partitions extending upward and forming chambers for the purpose of allowing the flow of air to be shut off from either of the chambers through the medium of the valves and openings in the air-flues F G H leading to the fan-box. These chambers may be as many in number as desired.

I I represent slides supported upon the frame A. Said slides are provided with a slot and screw to regulate their position. To the slides a rod, *a*, is attached, which extends downward and is secured to the frame by a pivot, by which means the ends of the frame are caused to be changed in the throw of the bolt to regulate the discharge from the same. The top of said rods *a* should be threaded and provided with a thumb-screw, so as to adjust the vertical position of the ends of the bolt-frame.

J represents the fan-box, divided into two divisions by the partition *x*, having a case, K, on each side communicating with the air-flues L and M, said flues extending along on the top of the machine, and communicating with the air-chambers through the openings F, G, and H.

N represents a cloth, which may be of the usual material, and graded or not as desired.

Below the cloth N the beaters P are arranged, being attached to the rock-shaft O in any suitable manner. These beaters P may be of wire, wood, or metal, or any other material, but should be arranged to have a beating motion against the cloth N, which I prefer to obtain through the medium of the rock-shafts O, link Q, springs T, and catch and cam R, the cam moving the link Q in one direction, which is pivoted to the rock-shafts, and, being released by the catch from the cam, is drawn rapidly back by the action of the springs T, one end of which being attached to the frame and the other to the rock-shafts, by which means the required motion to the beaters is obtained. The beaters do not strike upon the frame G′, but upon the cloth N; and to prevent damage to the cloth by the beaters the frame to which the beaters and their operating mechanism are connected has the same motion as the bolt-frame G′, so that the beaters move with the same speed back and forth with the cloth N. These beaters should be as many as necessary in number to keep the cloth properly clear. The advantage gained in using the beaters instead of brushes is that the brushes create a constant friction upon the cloth and wear the same, and as the beaters strike the cloth and then at once fall from the same by their weight, the material gathered in the same is raised by the current of air passing through the cloth.

U represents the end piece or conveying-spout, which is placed at the end of the bolt to catch the bran or coarse material passing over the end of the bolt, beneath which any receptacle may be placed to catch the same. This spout is formed widest at the top, and gradually decreasing in size downward by the inclines *b b*, altogether forming the end piece of the machine.

V represents a feed-slide gate furnished with a slot and set-screw, so as to be adjusted as desired.

W represents an opening through which the material passes into the hopper, falling upon the roller W′, by which it is carried to the bolt.

X represents the conveyer, placed directly below the hopper Y, in the usual manner.

A′ represents the fan-shaft, suitably journaled in the frame.

B′ represents a shaft, having a pulley, E′, by which motion is communicated to the machine. On the center of said shaft is a box, F′, attached to the frame, in which is placed an eccentric on the shaft for the purpose of giving the vibrating motion to the bolt-frame.

C′ represents a band or belt giving motion to the feed-roll W′. The feed-roll W′ is provided with a pulley on one end, from which the beaters are operated by means of the belt D′.

G′, Fig. 5, represents the bolt-frame with the cloth removed. Said frame is made in rectangular form, as shown, and provided with transverse bars L′, which are provided with thumb set-screws M′, which bear upon the longitudinal bars G″, the object of which is to adjust the cloth by raising or depressing the bars G″, to which the cloth is attached, so that the material will be evenly distributed upon the cloth. By this means either side of the cloth and the center may be adjusted as desired.

H′ represents knockers passing through suitable guides, N′, and provided with projections *e e*, which come in contact with the shaft I′, of the construction shown, by which means the knockers are raised as the shaft revolves until the flat portion of the shaft I′ passes the projections *e e*, when the knockers fall by their own weight upon the bar L′, thereby jarring the cloth for the purpose of keeping it clear, so that the air may pass through it, and the purified material readily pass through the cloth down into the conveyer. Motion is conveyed to the shaft I′ by a belt from a pulley on the end of the feed-roller to the pulley K′ upon the end of the shaft I′.

The operation is as follows: The material is fed by the roller W′ upon the cloth of the bolt-frame having the reciprocating motion, by which means and the current of air the heavier part of the bran is carried along the cloth and discharged into the spout U, while the lighter portion of the same is drawn up by suction through the valves B and openings F, G, and H into the divided fan-box and discharged at O′, while the purified material passes through the cloth into the hopper Y and conveyer X, where it is collected, graded, and discharged in the usual manner. The current of air, passing up through the cloth, valves B, and openings F, G, and H by suction into the fan-box, is received from openings on each side of the machine, just below the bolt-frame, said current of air being evenly distributed upon the cloth, as the valves B open entirely across the air-chambers, which produces a far better result than where the valves open only a short distance from either side or to the center, thus causing a draft centered upon the single point corresponding to the length of the valves.

I am aware that devices have been introduced for adjusting the hangers of shaking screens, and my claim is therefore limited to the special device employed, wherein the horizontally-adjustable plates I and vertically-adjustable rods *a* are used in combination for fixing not only the inclination but also the length of the hangers. I am aware, also, that beaters striking the cloth have been employed, and also knockers rapping the frame or other solid parts for detaching adhering particles, and so keeping open the meshes of screens; and I do not claim, broadly, the use of the beaters. My invention is distinguished from such machines in this, that I adapt my machine to the special duty of purifying middlings by combining in its construction various elements which are intended to produce an equable action on the material traversing the screen.

In the machines of Cabanes, patented in 1869, several fans were introduced, as expressed in his application, of sufficient power to buoy up the cloth and the material on the cloth, to prevent the sagging of the cloth, which otherwise would prevent the operation of the net-work of elastic cords, which he says were intended to be applied "when treating heavy grains or other material to be bolted." Currents of such force are obviously unsuited for treating flour, for which he says his machine was primarily intended. My machine is distinguishable from his in the use of exhaust-fans placed at the top of a case inclosing the screen, taking in air below the screen and conducting it through the entire extent of the cloth, and by giving mechanical support to the cloth by bars placed intermediately between the sides of the shaker-frame to support the cloth and maintain it on a plane on which the beaters, arranged in groups and distributed over the surface of the cloth, would act to keep the meshes open.

In Shipley's patent of December 15, 1857, he shows rods running longitudinally under the screens, and on each side of the machine he places bell-crank levers, which were arranged to strike upon these rods like hammers, and so, on the familiar principle of knockers, jar the screen and thus keep its meshes open. His machine was adapted for cleaning grain, and was not intended, nor was it suitable, for treating light substances like middlings, which contain flour and light flour-producing particles, which would be wasted in a grain-winnower. Such levers or knockers as he shows could not be used to strike against the bolting-cloth which is used in middlings-purifiers, nor did he propose to apply them directly to the screens which were then employed in winnowing grain. My invention is distinguished from his in this, that the air-currents generated by the exhaust-fan are drawn in such manner as to act by rising through the cloth and material carried on the cloth, and the meshes in my machine are kept open by beaters arranged in groups and distributed over the surface of the cloth and made to impinge directly against the cloth itself.

What I claim as my invention, and desire to secure by Letters Patent, is—

1. The horizontally-adjustable slides I and vertically-adjustable rods *a*, supporting the shaker-frame, substantially as and for the purpose set forth.

2. The combination of the screen and rock-shaft O, beaters P, reciprocating rod Q, and spring T, for actuating the beaters, substantially as set forth.

3. The combination, in a middlings-purifier, of a screen and fan for drawing a current of air up through the screen and a series of distinct beaters arranged in groups and actuated so as to impinge directly against the surface of the cloth for the purpose of keeping open its meshes, substantially as set forth.

4. The combination of the knockers H′ *e*, guides *n*′, shaft I′, and bar L′, constructed and arranged above the bolt-frame, as and for the purpose set forth.

5. The combination, in a middlings-purifier, of an inclosing-case, a fan connected by the case with the screen so as to draw currents of air through the screen, a screen the cloth of which is intermediately supported between the sides of the shaker-frame, so as to be maintained in plane, and a series of beaters arranged and impelled so as to impinge against different sections of the flat cloth for the purpose of keeping the meshes open, substantially as set forth.

In testimony whereof I hereunto set my hand in presence of two witnesses.

EDWIN CLARK.

Witnesses:
J. G. MASON,
H. LEWIS BRANDS.